United States Patent
Cai et al.

(10) Patent No.: US 12,332,126 B2
(45) Date of Patent: Jun. 17, 2025

(54) LOW-POWER-CONSUMPTION LOW-VOLTAGE DIGITAL TEMPERATURE SENSOR

(71) Applicant: Nanjing University Of Post And Telecommunications, Nanjing (CN)

(72) Inventors: Zhikuang Cai, Nanjing (CN); Zixuan Wang, Nanjing (CN); Chen Li, Nanjing (CN); Zushuai Xie, Nanjing (CN); Jingjing Guo, Nanjing (CN); Lu Liu, Nanjing (CN); Yufeng Guo, Nanjing (CN)

(73) Assignee: Nanjing University Of Post And Telecommunications, Jiangsu (CN)

( * ) Notice: Subject to any disclaimer, the term of this patent is extended or adjusted under 35 U.S.C. 154(b) by 0 days.

(21) Appl. No.: 18/264,069

(22) PCT Filed: Mar. 22, 2021

(86) PCT No.: PCT/CN2021/077539
§ 371 (c)(1),
(2) Date: Aug. 2, 2023

(87) PCT Pub. No.: WO2022/116400
PCT Pub. Date: Jun. 9, 2022

(65) Prior Publication Data
US 2024/0310220 A1 Sep. 19, 2024

(30) Foreign Application Priority Data
Dec. 3, 2020 (CN) .......................... 202011394619.7

(51) Int. Cl.
*G01K 7/01* (2006.01)
(52) U.S. Cl.
CPC ..................................... *G01K 7/01* (2013.01)

(58) Field of Classification Search
CPC .. G01K 7/01; G01K 7/02; G01K 7/16; G01K 7/30; Y02D 10/00
See application file for complete search history.

(56) References Cited

U.S. PATENT DOCUMENTS

| | | |
|---|---|---|
| 5,835,553 A | 11/1998 | Suzuki |
| 6,874,933 B1 | 4/2005 | Chan |

(Continued)

FOREIGN PATENT DOCUMENTS

| | | | |
|---|---|---|---|
| CN | 1997905 A | | 7/2007 |
| CN | 101915625 A | * | 12/2010 |

(Continued)

OTHER PUBLICATIONS

Qin Yan et al., "Design of Intelligent Temperature Sensor Chip Based on Delta-Sigma", Instrumentation, 2018, vol. 25, No. 6, p. 5-10.

*Primary Examiner* — Metasebia T Retebo
(74) *Attorney, Agent, or Firm* — IDEA Intellectual Limited; Margaret A. Burke; Sam T. Yip (57) ABSTRACT

A low-power-consumption low-voltage digital temperature sensor, which acquires temperature information by means of the frequency ratio of a first oscillation signal outputted by a first annular oscillator to a second oscillation signal outputted by a second annular oscillator. The first annular oscillator additionally uses an MOS varactor as a load capacitor, and uses the voltage characteristics of the MOS varactor to lower the power supply voltage fluctuation sensitivity, which is suitable for a low-power-consumption low-voltage environment; meanwhile, the sensor has the advantages of a small size, high digitization, self referencing and the like.

3 Claims, 7 Drawing Sheets

(56) References Cited

U.S. PATENT DOCUMENTS

| | | |
|---|---|---|
| 2007/0160113 A1 | 7/2007 | Kim et al. |
| 2019/0207591 A1 | 7/2019 | Choi et al. |
| 2020/0191660 A1 | 6/2020 | Choi et al. |

FOREIGN PATENT DOCUMENTS

| | | | | |
|---|---|---|---|---|
| CN | 102175338 A | | 9/2011 | |
| CN | 106840462 A | * | 6/2017 | |
| CN | 107356347 A | | 11/2017 | |
| CN | 108106747 A | | 6/2018 | |
| CN | 109724711 A | | 5/2019 | |
| CN | 110542849 A | * | 12/2019 | ............ G01K 13/00 |
| CN | 111366259 A | | 7/2020 | |
| CN | 112212992 A | | 1/2021 | |

* cited by examiner

LOW-POWER-CONSUMPTION LOW-VOLTAGE DIGITAL TEMPERATURE SENSOR

FIELD OF THE INVENTION

The invention relates to a low-power-consumption low-voltage temperature sensor, belonging to the field of integrated circuits.

BACKGROUND OF THE INVENTION

Today, processors and Dynamic Random Access Memories (DRAMs) utilize multiple on-chip temperature sensors for thermal monitoring. In the case of a processor, temperature sensors help maintain performance and reliability by monitoring cold and hot spots. On the other hand, the DRAM controls the rate of self-refresh operation according to the current temperature of the chip to save power consumption. Since it is difficult to predict the hot spot locations at the design stage, microprocessors contain as many as ten or more sensors per core. Driven by the ever-increasing computation demand, the number of temperature sensors in a processor will continue to increase as the number of cores per processor per year increases.

Therefore, there is a strong need for a low power, low cost temperature sensor suitable for integration in processors and DRAMs. The sensor must contain several key functions to make it suitable for use in a processor. First, they must be small and compact so that they can be placed very close to the hot spot. Sensors designed to operate using a logic supply voltage help reduce the overhead associated with wiring of a separate dedicated power supply. However, the logic power supply is very noisy due to the constant switching of the logic gates. Furthermore, due to the use of dynamic voltage scaling in modern processors, their average voltage may vary greatly. Therefore, the sensor must be immune to variations in the supply voltage. The SoC and processor also employ a dynamic frequency scaling algorithm, where the switching frequency is scaled to trade off power versus performance. The use of dynamic voltage and frequency scaling algorithms can limit the design of the temperature sensor, making the sensor no longer dependent on using the external frequency or supply voltage as a reference. It is an expensive task to spread the reference frequency, voltage and bias current dedicated to the temperature sensor throughout the processor. Therefore, the temperature sensor must be self-referencing. Finally, the temperature sensor architecture should be relatively easy to design and enable it to be ported to different process nodes.

Currently, several full CMOS based sensor architectures have been proposed to meet the above requirements: thermal diffusivity-based sensors have higher accuracy and smaller area, but their power consumption is higher. The DTMOST-based sensor provides high accuracy, low power consumption and operating voltages below 1V, but occupies a large area.

SUMMARY OF THE INVENTION

The invention aims to provide a low-power-consumption low-voltage digital temperature sensor utilizing the voltage characteristic of a metal-oxide semiconductor (MOS) varactor.

The invention adopts the following technical scheme for solving the technical problems: the invention designs a low-power-consumption low-voltage digital temperature sensor, which comprises a first ring oscillator, a second ring oscillator, a first integrator, a second integrator, a D trigger and a linear optimization module, wherein an output end of the first ring oscillator is connected with an input end of the first integrator; an output end of the second ring oscillator is connected with a clock input end of the second integrator, a clock input end of a state machine and a clock input end of the D trigger; an output end of the first integrator is connected with a data input end of the D trigger; an output end of the second integrator is connected with a data input end of the state machine; a first output end of the state machine is connected with a control end of the first integrator; a second output end of the state machine is connected with a control end of the second integrator; and a data output end of the D trigger is connected with an input end of the linear optimization module.

As a preferred technical scheme of the invention: the first ring oscillator comprises N first delay units, wherein N is a positive odd number, the N first delay units are sequentially connected end to end form a closed loop, and an output end of a last first delay unit is used as an output end of the first ring oscillator.

As a preferred technical scheme of the invention: the second ring oscillator comprises M second delay units, wherein M is a positive odd number, the M second delay units are sequentially connected end to end to form a closed loop, and an output end of a last second delay unit is used as an output end of the second ring oscillator.

As a preferred technical scheme of the invention: the first delay unit comprises a first PMOS tube $M_{P1}$, a second PMOS transistor $M_{P2}$, a first NMOS transistor $M_{N1}$ and a first MOS capacitor Cm, wherein, a gate of the first PMOS transistor $M_{P1}$ is connected with a gate of the first NMOS transistor $M_{N1}$ and used as an input end of the first delay unit; a drain of the first PMOS transistor $M_{P1}$ is connected with a drain of the first NMOS transistor $M_{N1}$, a source of the second PMOS transistor $M_{P2}$ and a drain second PMOS transistor a substrate of the second PMOS transistor $M_{P2}$ an upper electrode plate of first MOS capacitor $C_{M1}$ and used as an output end of the first delay unit, a source of the first PMOS transistor $M_{P1}$ and a gate of the second PMOS transistor $M_{P2}$ are connected with power supply voltage; a source of the first NMOS transistor $M_{N1}$ and a lower electrode plate of the first MOS capacitor $C_{M1}$ are connected to ground.

As a preferred technical scheme of the invention: the second delay unit comprises a third PMOS tube $M_{P3}$, a second NMOS transistor $M_{N2}$ and a second MOS capacitor $C_{M2}$, wherein a gate of the third PMOS transistor $M_{P3}$ is connected with a gate of the second NMOS tube $M_{N2}$ and used as an input end of the second delay unit; a drain of the third PMOS transistor $M_{P3}$ is connected with a drain of the second NMOS tube $M_{N2}$ and an upper electrode plate of the second MOS capacitor $C_{M2}$ and used as an output end of the second delay unit; a source of the third PMOS transistor $M_{P3}$ is connected with a power supply voltage; a source of the second NMOS transistor $M_{N2}$ and a lower electrode plate of the second MOS capacitor $C_{M2}$ are connected to ground.

Compared with the prior art, the low-power-consumption low-voltage digital temperature sensor has the following technical effects: the invention relates to the low-power-consumption low-voltage digital temperature sensor, which is characterized in that temperature information is obtained through the frequency ratio of a first oscillation signal output by the first ring oscillator to a second oscillation signal output by the second ring oscillator, the two ring oscillators are designed to have different temperature sensitivities, the first integrator and the second integrator respectively integrate the phases of the first oscillation signal and the second oscillation signal, the state machine controls the integrators to reset and freeze, when the integration result of the second integrator reaches a threshold value, the integration result of the first integrator is frozen and output, the D trigger samples by taking the second oscillation signal as a clock to obtain the temperature information, the first ring oscillator additionally adopts the MOS varactor as a load capacitor, the voltage fluctuation sensitivity is reduced by utilizing the voltage characteristic of the varactor, and the sensor has low power consumption and small size, high digitalization, self-reference and the like.

DETAILED DESCRIPTION

The following description will explain embodiments of the present invention in further detail with reference to the accompanying drawings.

Figure 1:
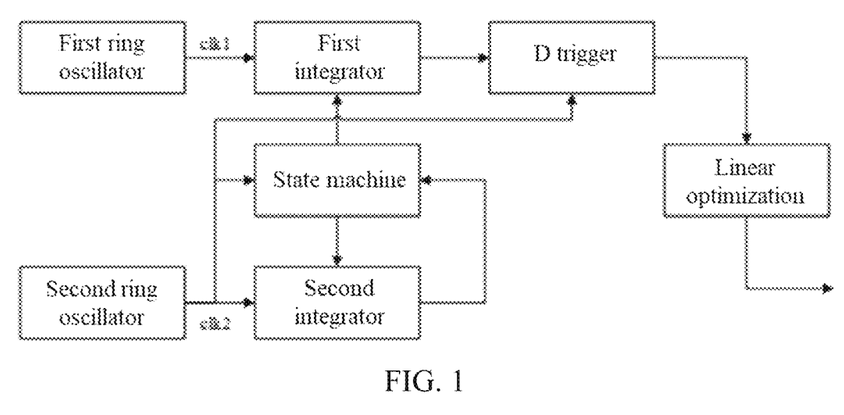
FIG. 1 is a block diagram of the main circuit of the low power consumption low voltage digital temperature sensor designed by the present invention.

As shown in FIG. 1, the low power consumption and low voltage digital temperature sensor designed by the present invention comprises a first ring oscillator, a second ring oscillator, a first integrator, a second integrator, a D trigger and a linear optimization module, wherein an output end of the first ring oscillator is connected with an input end of the first integrator; an output end of the second ring oscillator is connected with a clock input end of the second integrator, a clock input end of a state machine and a clock input end of the D trigger; an output end of the first integrator is connected with a data input end of the D trigger; an output end of the second integrator is connected with a data input end of the state machine; a first output end of the state machine is connected with a control end of the first integrator; a second output end of the state machine is connected with a control end of the second integrator; and a data output end of the D trigger is connected with an input end of the linear optimization module.

Figure 2:
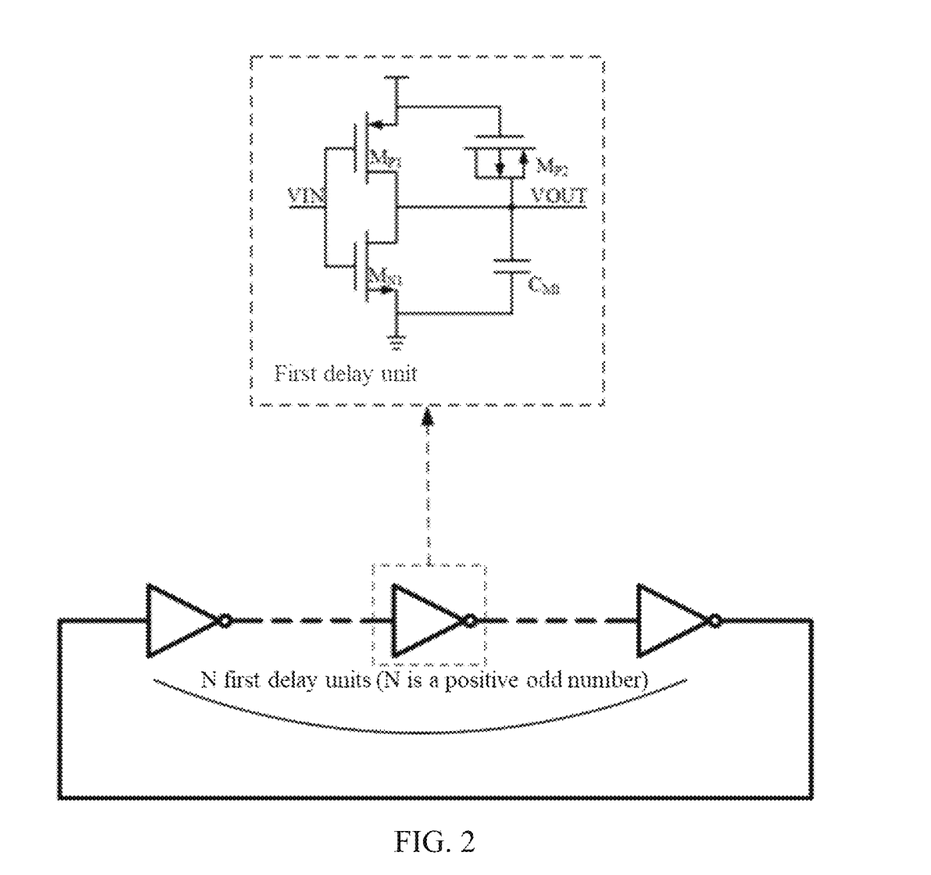
FIG. 2 is a schematic diagram of a circuit configuration of the first ring oscillator designed by the present invention.

As shown in FIG. 2, the first ring oscillator comprises N first delay units, wherein N is a positive odd number, the N first delay units are sequentially connected end to end form a closed loop, and an output end of a last first delay unit is used as an output end of the first ring oscillator.

In the practical application process of the low-power-consumption low-voltage digital temperature sensor, the first delay unit is specifically designed, as shown in FIG. 2 and comprises a first PMOS tube $M_{P1}$, a second PMOS transistor $M_{P2}$, a first NMOS transistor $M_{N1}$ and a first MOS capacitor $C_{M1}$, wherein, a gate of the first PMOS transistor $M_{P1}$ is connected with a gate of the first NMOS transistor $M_{N1}$ and used as an input end of the first delay unit; a drain of the first PMOS transistor $M_{P1}$ is connected with a drain of the first NMOS transistor $M_{N1}$, a source of the second PMOS transistor $M_{P2}$ and a drain second PMOS transistor a substrate of the second PMOS transistor $M_{P2}$ an upper electrode plate of first MOS capacitor $C_{M1}$ and used as an output end of the first delay unit; a source of the first PMOS transistor $M_{P1}$ and a gate of the second PMOS transistor $M_{P2}$ are connected with power supply voltage; a source of the first NMOS transistor $M_{N1}$ and a lower electrode plate of the first MOS capacitor Curare connected to ground.

Figure 3:
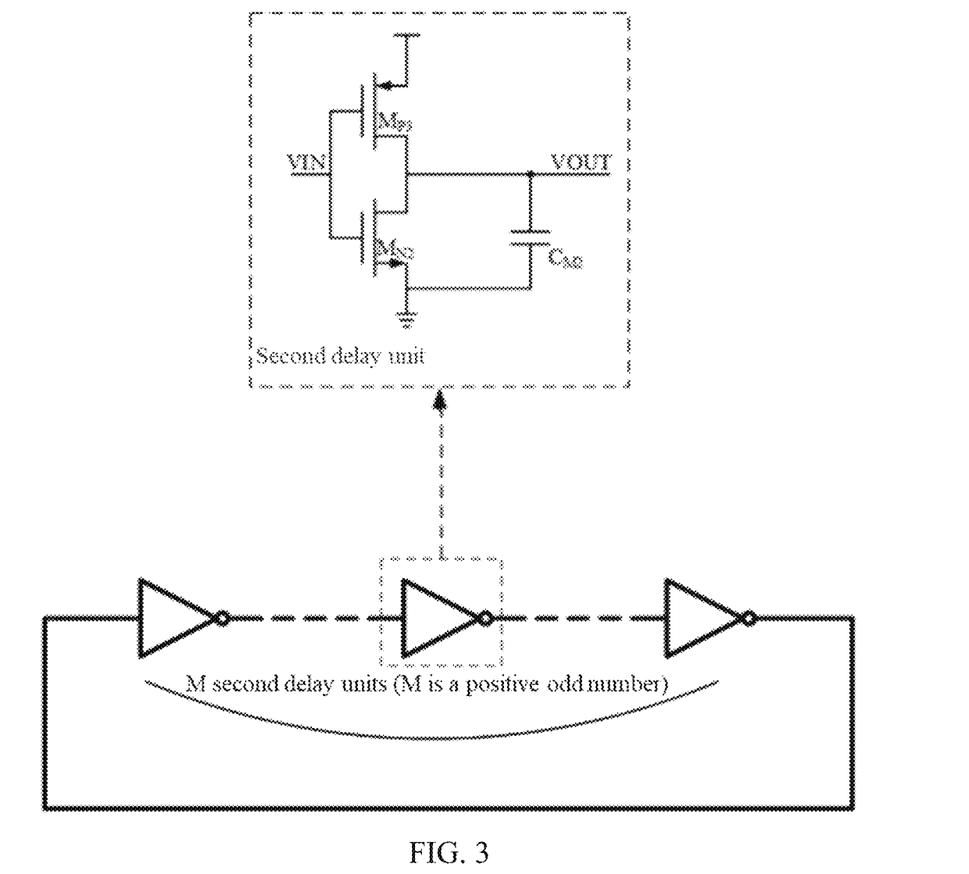
FIG. 3 is a schematic diagram of the circuit configuration of the second ring oscillator designed by the present invention.

As shown in FIG. 3, the second ring oscillator comprises M second delay units, wherein M is a positive odd number, the M second delay units are sequentially connected end to end to form a closed loop, and an output end of a last second delay unit is used as an output end of the second ring oscillator.

In the practical application process of the low-power-consumption low-voltage digital temperature sensor, the second delay unit is specifically designed as shown in FIG. 3, and comprises a third PMOS tube $M_{P3}$, a second NMOS transistor $M_{N2}$ and a second MOS capacitor $C_{M2}$, wherein a gate of the third PMOS transistor $M_{P3}$ is connected with a gate of the second NMOS tube $M_{N2}$ and used as an input end of the second delay unit; a drain of the third PMOS transistor $M_{P3}$ is connected with a drain of the second NMOS tube $M_{N2}$ and an upper electrode plate of the second MOS capacitor $C_{M2}$ and used as an output end of the second delay unit; a source of the third PMOS transistor $M_{P3}$ is connected with a power supply voltage; a source of the second NMOS transistor $M_{N2}$ and a lower electrode plate of the second MOS capacitor $C_{M2}$ are connected to ground.

The first order equation for the frequency ratio of the first oscillation signal to the second oscillation signal, $F_{RO1}/F_{RO2}$, can be written as:

$$\frac{F_{RO1}}{F_{RO2}} \propto \frac{(V_{DD} - V_{TH1})^\alpha}{(V_{DD} - V_{TH2})^\alpha} \frac{C_{M2}}{C_{M1} + C_T},$$

where $V_{DD}$ is the power supply voltage to the first and second ring oscillators, $V_{TH1}$ and $V_{TH2}$ are the threshold voltage of MOS transistors in the first and second ring oscillators, $C_T$ is equivalent capacitance of the a second PMOS transistor $M_{P2}$, $\alpha$ is a model of $\alpha$ power law, $\alpha \approx 1$. As the threshold voltage of the first ring oscillator $V_{TH1}$ is designed to be higher than the threshold voltage of the second ring oscillator $V_{TH2}$ for $\Delta V_{TH}$, the above formula can be simplified as:

$$\frac{F_{RO1}}{F_{RO2}} \propto \left(1 - \frac{\Delta V_{TH}}{V_{DD} - V_{TH}}\right)^\alpha \frac{C_{M2}}{C_{M1} + C_T}.$$

Figure 4:
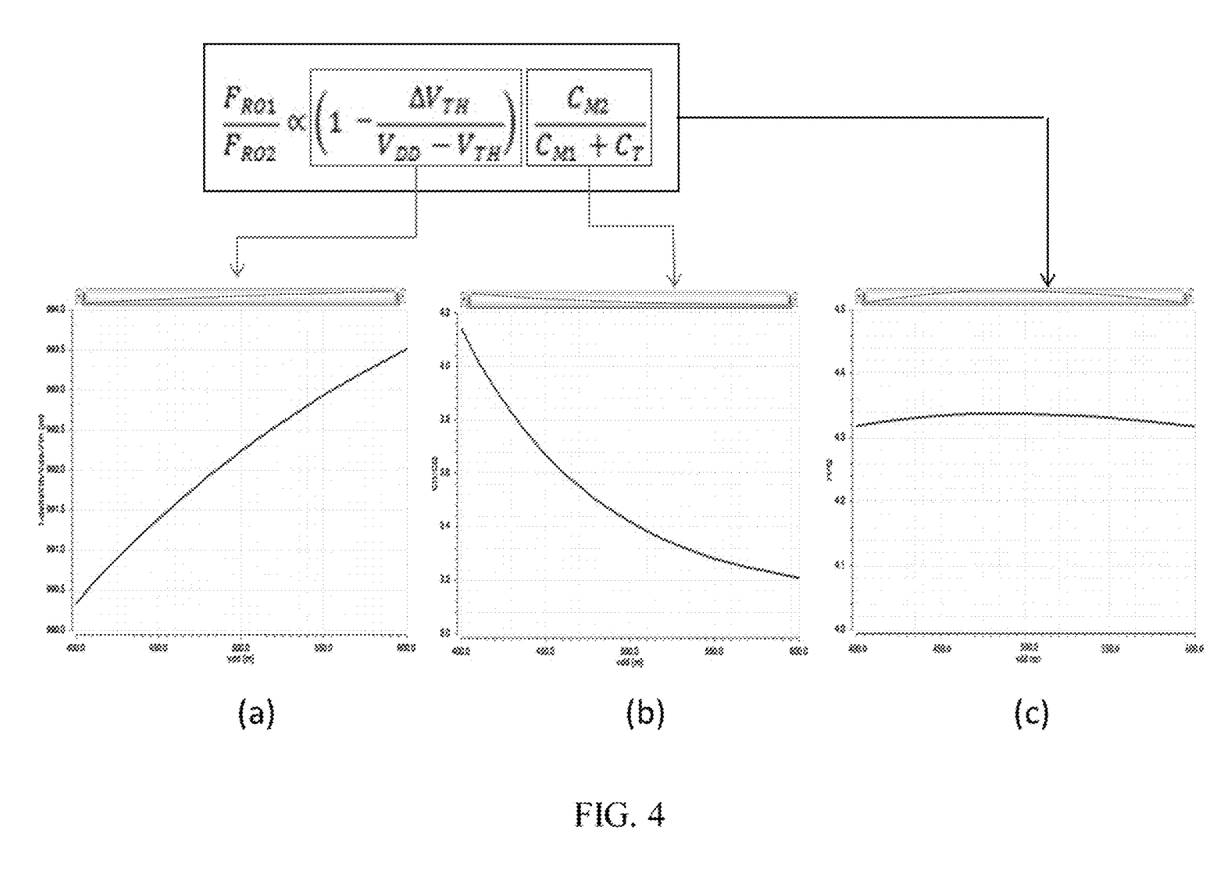
FIG. 4 shows theory and simulation curves of low voltage fluctuation sensitivity designed by the present invention.
Figure 5A:
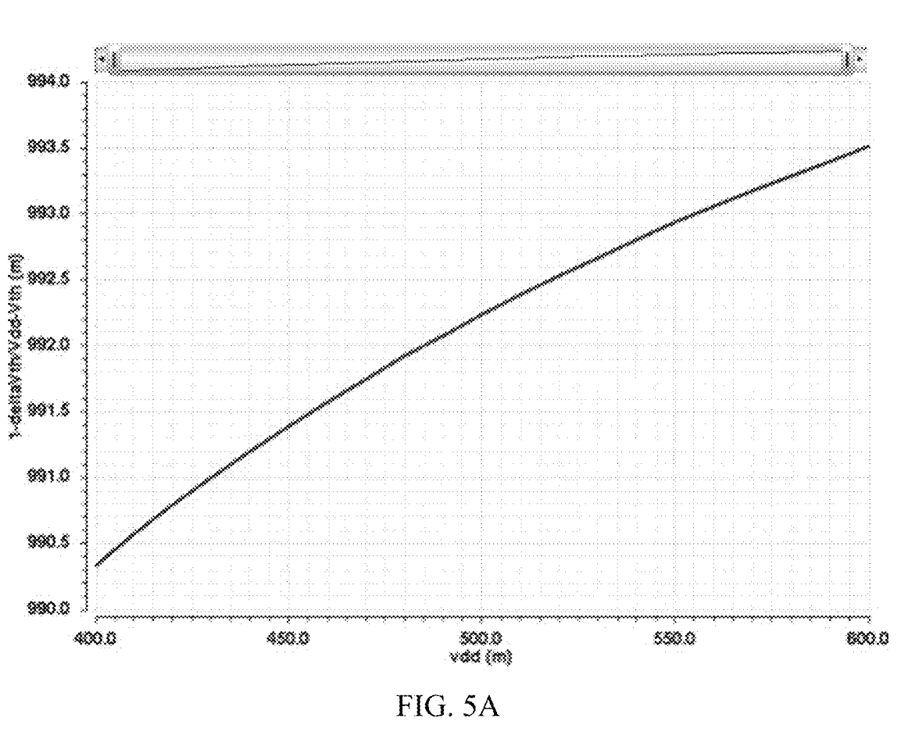
FIGS. 5A to 5C show close-up views of the simulation curves (a) to (c) of FIG. 4 respectively.

As shown in FIG. 4 and FIG. 5A, the above formula consists of two terms. The first term has positive sensitivity to supply voltage, the second term is $C_{M2}/(C_{M1}+C_T)$.

Figure 5B:
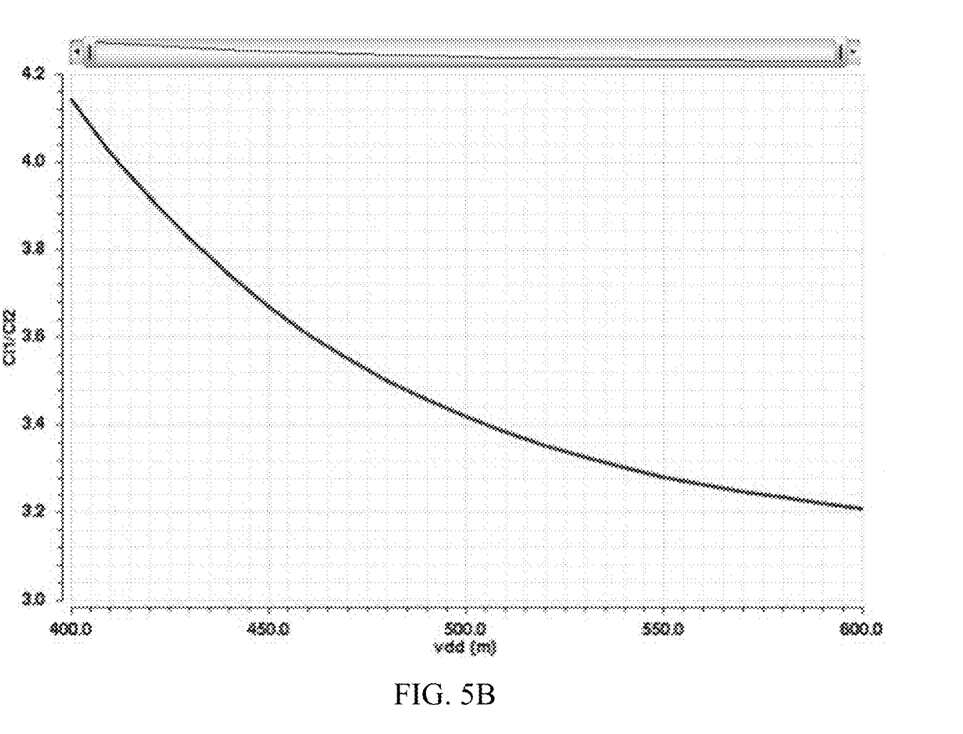
Figure 5C:
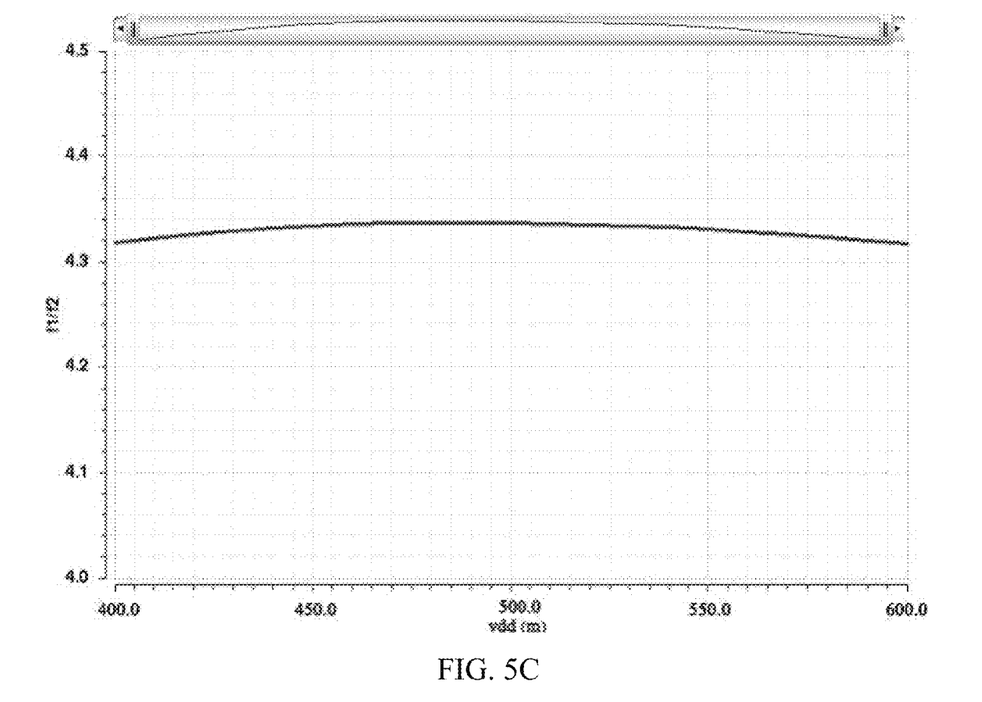

In the present invention, the first ring oscillator additionally adopts a MOS varactor as a load capacitor, and utilizes the voltage characteristic of the MOS varactor, when $V_{DD}$ is increased, the first MOS capacitor $C_{M1}$ and the second MOS capacitor $C_{M2}$ are unchanged, while equivalent capacitance $C_T$ of the second PMOS transistor $M_{P2}$ becomes larger, as shown in FIG. 4 and FIG. 5B, the second term has a negative sensitivity to the supply voltage. As shown in FIG. 4 and FIG. 5C, the result of the combination of the first term and the second term makes the frequency ratio achieve lower voltage fluctuation sensitivity.

The embodiments of the present invention have been described in detail with reference to the drawings, but the present invention is not limited to the above embodiments, and various changes can be made within the knowledge of those skilled in the art without departing from the gist of the present invention.

What is claimed is:

1. A low-power-consumption low-voltage digital temperature sensor, characterized in that: comprising a first ring oscillator, a second ring oscillator, a first integrator, a second integrator, a D trigger and a linear optimization module, wherein an output end of the first ring oscillator is connected with an input end of the first integrator; an output end of the second ring oscillator is connected with a clock input end of the second integrator, a clock input end of a state machine and a clock input end of the D trigger; an output end of the first integrator is connected with a data input end of the D trigger; an output end of the second integrator is connected with a data input end of the state machine; a first output end of the state machine is connected with a control end of the first integrator; a second output end of the state machine is connected with a control end of the second integrator; and a data output end of the D trigger is connected with an input end of the linear optimization module; the first ring oscillator comprises N first delay units, wherein N is a positive odd number, the N first delay units are sequentially connected end to end form a closed loop, and an output end of a last first delay unit is used as an output end of the first ring oscillator; the first delay unit comprises a first PMOS tube $[M_{P1}]$, a second PMOS transistor $[M_{P2}]$, a first NMOS transistor $[M_{N1}]$ and a first metal-oxide semiconductor (MOS) capacitor $[C_{M1}]$, wherein, a gate of the first PMOS transistor $[M_{P1}]$ is connected with a gate of the first NMOS transistor $[M_{N1}]$ and used as an input end of the first delay unit; a drain of the first PMOS transistor $[M_{P1}]$ is connected with a drain of the first NMOS transistor $[M_{N1}]$, a source of the second PMOS transistor $[M_{P2}]$ and a drain second PMOS transistor a substrate of the second PMOS transistor $[M_{P2}]$ an upper electrode plate of first MOS capacitor $[C_{M1}]$ and used as an output end of the first delay unit; a source of the first PMOS transistor $[M_{P1}]$ and a gate of the second PMOS transistor $[M_{P2}]$ are connected with power supply voltage; a source of the first NMOS transistor $[M_{N1}]$ and a lower electrode plate of the first MOS capacitor $[C_{M1}]$ are connected to ground.

2. The low-power-consumption low-voltage digital temperature sensor of claim 1, characterized in that: the second ring oscillator comprises M second delay units, wherein M is a positive odd number, the M second delay units are sequentially connected end to end to form a closed loop, and an output end of a last second delay unit is used as an output end of the second ring oscillator.

3. The low-power-consumption low-voltage digital temperature sensor of claim 2, characterized in that: the second delay unit comprises a third PMOS tube $[M_{P3}]$, a second NMOS transistor $[M_{N2}]$ and a second MOS capacitor $[C_{M2}]$, wherein a gate of the third PMOS transistor $[M_{P3}]$ is connected with a gate of the second NMOS tube $[M_{N2}]$ and used as an input end of the second delay unit; a drain of the third PMOS transistor $[M_{P3}]$ is connected with a drain of the second NMOS tube $[M_{N2}]$ and an upper electrode plate of the second MOS capacitor $[C_{M2}]$ and used as an output end of the second delay unit; a source of the third PMOS transistor $[M_{P3}]$ is connected with a power supply voltage; a source of the second NMOS transistor $[M_{N2}]$ and a lower electrode plate of the second MOS capacitor $[C_{M2}]$ are connected to ground.

* * * * *